US012748183B2

(12) United States Patent
Graf et al.

(10) Patent No.: US 12,748,183 B2
(45) Date of Patent: Sep. 29, 2026

(54) TESTING DEVICE FOR TESTING A DISTANCE SENSOR THAT OPERATES USING ELECTROMAGNETIC WAVES

(71) Applicant: dSPACE GmbH, Paderborn (DE)

(72) Inventors: Sebastian Graf, Paderborn (DE); Christian Hohenbrink, Paderborn (DE); Chris Hoffmann, Zwiesel (DE); Tim Fisch, Paderborn (DE)

(73) Assignee: dSPACE SE & Co. KG, Paderborn (DE)

( * ) Notice: Subject to any disclaimer, the term of this patent is extended or adjusted under 35 U.S.C. 154(b) by 309 days.

(21) Appl. No.: 18/578,334

(22) PCT Filed: Jul. 12, 2022

(86) PCT No.: PCT/EP2022/069437

§ 371 (c)(1),
(2) Date: Feb. 13, 2024

(87) PCT Pub. No.: WO2023/285451

PCT Pub. Date: Jan. 19, 2023

(65) Prior Publication Data

US 2024/0385289 A1 Nov. 21, 2024

(30) Foreign Application Priority Data

Jul. 15, 2021 (DE) ..................... 10 2021 118 333.2

(51) Int. Cl.
*G01S 7/40* (2006.01)

(52) U.S. Cl.
CPC .......... *G01S 7/4056* (2013.01); *G01S 7/4065* (2021.05)

(58) Field of Classification Search
None
See application file for complete search history.

(56) References Cited

U.S. PATENT DOCUMENTS

2022/0099797 A1 3/2022 Paul et al.
2022/0179043 A1* 6/2022 Vook ......................... G01S 7/40

FOREIGN PATENT DOCUMENTS

JP 10020020 A 1/1998
JP 10282219 A 10/1998
(Continued)

OTHER PUBLICATIONS

Machine translation of WO-2020157039-A2 (Year: 2020).*
Machine translation of WO-2020165191-A1.*

*Primary Examiner* — Vladimir Magloire
*Assistant Examiner* — Anna K. Gosling
(74) *Attorney, Agent, or Firm* — Leydig, Voit & Mayer, Ltd.

(57) ABSTRACT

A testing device for testing a distance sensor includes: a receiving element for receiving an electromagnetic free-space wave as a received signal; an emission element for emitting an electromagnetic output signal; and a signal processing unit. During a simulation operation, the received signal or a received signal derived from the received signal is guided via a signal processing unit with a predefinable time delay to form a time-delayed signal as a simulated reflection signal. The signal processing unit is configured to fully process a received temporally coherent and temporally limited sensor signal or a received temporally coherent and temporally limited sensor signal derived from the received sensor signal in a delay step with the predefinable time delay as a constant working time delay to form a time-delayed sensor signal, wherein the predefinable time delay was predefined at the start of the delay step.

11 Claims, 7 Drawing Sheets

(56) References Cited

FOREIGN PATENT DOCUMENTS

| | | | | |
|---|---|---|---|---|
| JP | 2000115984 | A | 4/2000 | |
| JP | 2009257828 | A | 11/2009 | |
| WO | WO-2020157039 | A2 * | 8/2020 | ........... G01S 7/4091 |
| WO | WO-2020165191 | A1 * | 8/2020 | ............... G01S 7/40 |

* cited by examiner

TESTING DEVICE FOR TESTING A DISTANCE SENSOR THAT OPERATES USING ELECTROMAGNETIC WAVES

CROSS-REFERENCE TO PRIOR APPLICATIONS

This application is a U.S. National Phase application under 35 U.S.C. § 371 of International Application No. PCT/EP2022/069437, filed on Jul. 12, 2022, and claims benefit to German Patent Application No. DE 10 2021 118 333.2, filed on Jul. 15, 2021. The International Application was published in German on Jan. 19, 2023 as WO 2023/285451 A1 under PCT Article 21 (2).

TECHNICAL FIELD

The invention relates to a testing device for testing a distance sensor that operates using electromagnetic waves in the form of at least one temporally coherent and temporally limited sensor signal, comprising a receiving element for receiving an electromagnetic free-space wave as a received signal and an emission element for emitting an electromagnetic output signal, wherein, during a simulation operation, the received signal or a received signal derived from the received signal is guided via a signal processing unit with a predefinable time delay and is thus time-delayed to form a time-delayed signal as a simulated reflection signal, wherein the time-delayed signal or a time-delayed signal derived from the time-delayed signal is emitted as the output signal via the emission element. In addition, the invention also relates to a method for operating the testing device described above.

BACKGROUND

Testing devices for testing distance sensors and methods for operating such testing devices are known from various technical areas and fields of application, for example from the field of control unit development and control unit testing, in particular in the automotive sector: see for example WO 2020/165191 A1. Another field of application is end-of-line test benches, i.e. equipment used to test products at the end of a production line, in this case distance sensors. The present application concerns the testing of distance sensors that operate with electromagnetic waves. In the automotive sector, radar sensors are predominantly used. In principle, however, distance sensors can also be tested that operate in a different frequency range of electromagnetic waves, for example in the visible light range, or that operate with electromagnetic radiation sources that emit electromagnetic waves with a long coherence length, such as in laser applications (e.g, lidar).

With the testing devices described above, it is possible to simulate an object at practically any distance from the distance sensor to be tested. Distance sensors of the type considered here basically work in such a way that electromagnetic waves emitted by them are reflected by an object in the radiation range of the distance sensor, the distance sensor receives the reflected electromagnetic waves and determines the distance to the object from the propagation time of the electromagnetic waves. The signal propagation time can be determined directly (time-of-flight measurement), but it is often determined indirectly via apt signal evaluations. While in the first case, very short sensor signals are often used, i.e. pulses, in the latter case, transmission signals that are recognizably extended in time are usually used. An example of this would be frequency-modulated continuous wave signals.

To test the distance sensor, the testing device is positioned in its radiation range, the testing device receives the free-space waves emitted by the distance sensor and delays this received signal with its signal processing unit according to a prespecified time delay and then radiates the time-delayed signal via its emission element back in the direction of the distance sensor to be tested, giving the distance sensor the impression of an object that is at a distance corresponding to the set time delay.

Distance sensors that work with temporally coherent and temporally limited sensor signals are considered here. In the prior art, such a signal is known, for example as a chirp signal (or simply "chirp"), i.e. as a sinusoidal signal whose frequency changes as a function of time. Realizations with other types of modulation are also conceivable. Some distance sensors transmit a large number of such temporally limited chirps, for example 128 or 256, with short transmission pauses between the chirps. Such a sequence of a plurality of chirps following one another at short intervals is followed by a longer transmission pause for signal processing. The chirp sequence including the transmission pauses is also referred to as a frame. Currently, a frame repetition rate of several tens of hertz is typically used for a continuous measurement. The distance sensor to be tested can obtain a distance measurement value from each individual chirp transmission signal sent out. This is done by mixing the still-transmitted part of the chirp signal with the reflected and already received part of the chirp signal. The signal propagation time and thus the distance information is obtained from the frequency of the mixed signal. If the object from which the emitted chirp signals are reflected has a radial movement component relative to the distance sensor, then the mixed signals of successive chirps have phase differences that are determined from which a piece of speed information regarding the radial movement component can be and is obtained directly.

It has been noted that, when using the described testing device for testing distance sensors, in particular when using a dynamic simulation mode with changing specifications for the specified time delay, apparently incorrect signal evaluations repeatedly occur at the distance sensors, in particular with regard to the radial speed of simulated objects, for example by assigning a large number of speeds scattered over a wide range of values to the one detected object.

SUMMARY

In an exemplary embodiment, the present invention provides a testing device for testing a distance sensor that operates using electromagnetic waves in the form of at least one temporally coherent and temporally limited sensor signal. The testing device includes: a receiving element for receiving an electromagnetic free-space wave as a received signal: an emission element for emitting an electromagnetic output signal; and a signal processing unit. During a simulation operation, the received signal or a received signal derived from the received signal is guided via a signal processing unit with a predefinable time delay to form a time-delayed signal as a simulated reflection signal, wherein the time-delayed signal or a time-delayed signal derived from the time-delayed signal is emitted as the output signal via the emission element. The signal processing unit is configured to fully process a received temporally coherent and temporally limited sensor signal or a received temporally coherent and temporally limited sensor signal derived from the received sensor signal in a delay step with the predefinable time delay as a constant working time delay to form a time-delayed sensor signal, wherein the predefinable time delay was predefined at the start of the delay step.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
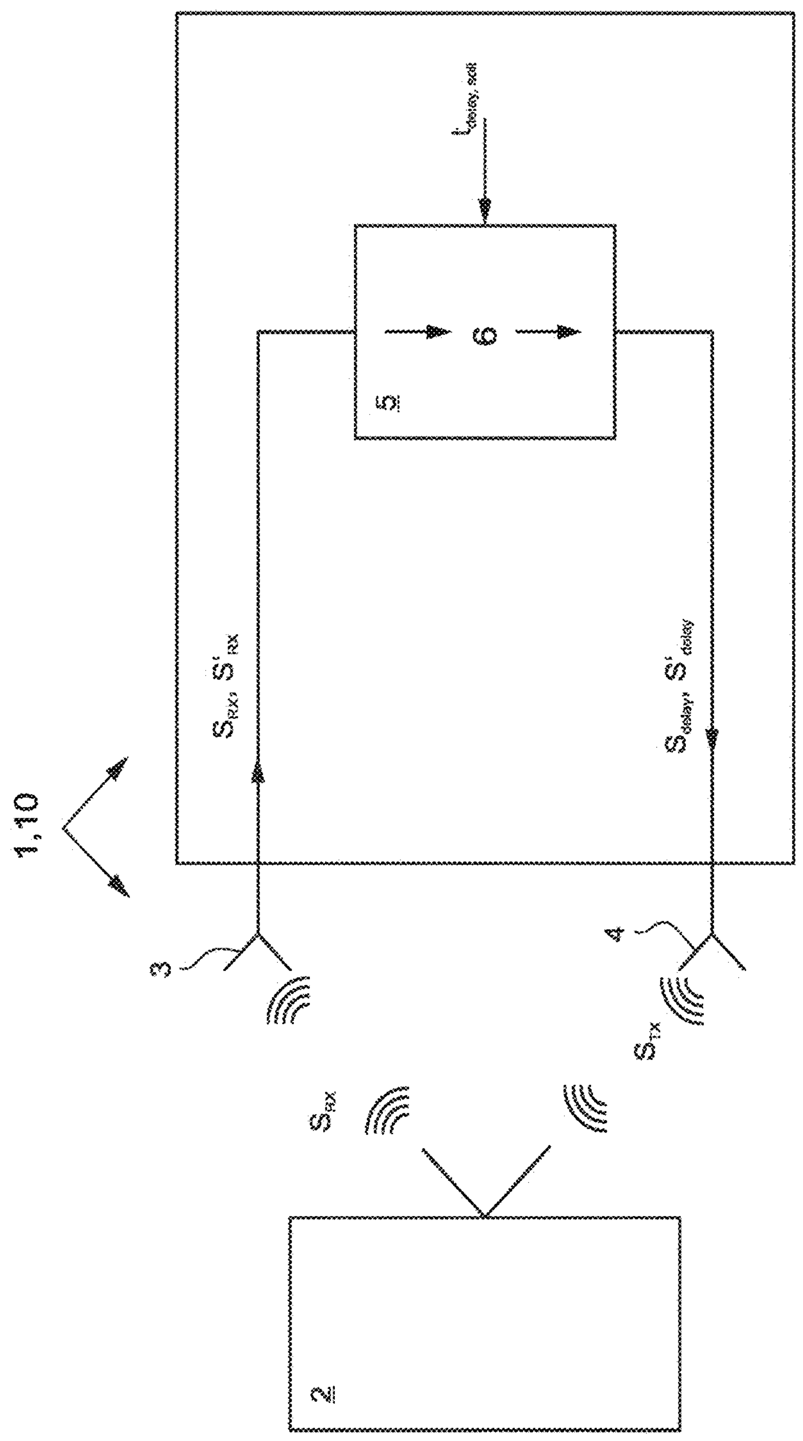
FIG. 1 schematically illustrates a known testing device and a known method for testing a distance sensor that operates with electromagnetic waves.

Exemplary embodiment of the present invention provide a testing device and a method in such a way that the error situations known from the prior art are avoided.

In order to solve the problem discussed above, it first had to be recognized whether the previously described and observed apparent misinterpretation by the distance sensors to be tested, in particular with regard to the speed signals, has its origin in the testing device. It has been recognized that the apparent incorrect evaluations of the distance sensors can occur (but do not have to occur) whenever the signal processing unit is in the process of processing a received temporally coherent and temporally limited sensor signal with an initially specified time delay to form a time-delayed sensor signal and, during this processing, another time delay is specified and enters directly into the still-ongoing delay process. The changed, predefinable time delay being directly taken into account often leads to discontinuities in the curve of the delayed sensor signal, and these signals with discontinuities are then also ultimately present in the distance sensors as a simulated reflected sensor signal with discontinuities, and lead to the apparently incorrect evaluations there. These are “apparently incorrect” because the evaluation is carried out correctly, but the underlying database is inconsistent. In real situations, i.e. when detecting real moving objects, such a discontinuity cannot practically occur, as distances from real objects cannot change abruptly.

Exemplary embodiments of the present invention provide a signal processing unit which fully processes a received temporally coherent and temporally limited sensor signal or a received temporally coherent and temporally limited sensor signal derived from the received sensor signal in a delay step with the predefined time delay as a constant working time delay to form a time-delayed sensor signal, which predefined time delay was predefined at the start of the delay step and thus of the processing of the received temporally limited sensor signal, even when the predefinable time delay changes during the delay step and thus during the ongoing processing of the received sensor signal or of the received sensor signal derived from the received sensor signal.

Exemplary embodiments of the invention therefore provide for completing, once it has been started, a delay step which is based on a particular predetermined time delay also with this time delay, which is maintained as a constant work time delay, even if a new predefinable time delay has been set or predefined in the meantime. A sensor signal to be delayed is thus fully treated with a uniform working time delay. It has been found that the problems with the evaluation of the simulated reflection signals in the distance sensor can be practically completely eliminated by utilizing exemplary embodiments of the invention.

A conceptual distinction is made here between the received signal and the received signal derived from the received signal. The received signal itself is based on the free-space wave picked up by the receiving element of the testing device. If a further signal processing takes place before the received signal is forwarded to the signal processing unit, then strictly speaking, this is no longer the received signal itself, but a received signal derived from it. This is the case, for example, when the received signal is mixed down to a lower intermediate frequency, which reduces the demands on the technical realization of the signal transmission paths and also on the speed of the signal processing. Of course, this also applies analogously to the time-delayed signal or the time-delayed signal derived from the time-delayed signal, without requiring further explanation.

A preferred embodiment of the testing device is characterized by the fact that the ongoing processing of the received sensor signal, or of the received sensor signal derived from the received sensor signal, is detected in the delay step in that the signal processing unit determines the signal level or the signal power of the received signal or of the received signal derived from the received signal and, if a predetermined active threshold value for the signal level or the signal power is exceeded by the determined signal level or the determined signal power, concludes that the processing of the received sensor signal or of the sensor signal derived from the received sensor signal is still ongoing. The active threshold value for the signal level or signal power should be selected so that the signal noise in the operating environment of the testing device, which can never be completely avoided, can be clearly distinguished from a useful signal that is present.

In this context, a further preferred embodiment of the testing device is characterized by the fact that the signal processing unit detects the start of the delay step and thus of the ongoing processing of the received sensor signal or of the received sensor signal derived from the received sensor signal when the predetermined active threshold value for the signal level or the signal power is exceeded by the determined signal level or the determined signal power for a predetermined active time period. This procedure makes it possible to reliably distinguish interference signals that may exceed the active threshold but only last for a very short time from useful signals that are to be delayed.

With the above-mentioned embodiments, it is of course not only possible to detect the start of the delay step, but it is also possible to detect whether a delay step is still ongoing or not, i.e. not only the start but also the existence of the delay step can be detected.

Accordingly, the end of the delay step or the absence of the delay step can also be detected. In a preferred exemplary embodiment of the testing device, it is provided that the end of the delay step and thus the absence of the ongoing processing of the received sensor signal, or of the received sensor signal derived from the received sensor signal, is detected in that the signal processing unit determines the signal level or the signal power of the received signal or of the received signal derived from the received signal and, if a predetermined passive threshold value for the signal level or the signal power is undershot by the determined signal level or the determined signal power, concludes that the processing of the received sensor signal or of the sensor signal derived from the received sensor signal is absent.

The active and passive thresholds can be selected identically. In an advantageous embodiment, the active threshold value is selected to be greater than the passive threshold value in order to achieve a certain hysteresis effect.

Corresponding to the active time period, a passive time period can also be defined for recognizing the end of the delay step or the absence of the delay step. It is then also provided that the signal processing unit detects the end of the delay step and thus the termination of the ongoing processing of the received sensor signal or of the received sensor signal derived from the received sensor signal when the predetermined passive threshold value for the signal level or the signal power is undershot by the determined signal level or the determined signal power for a predetermined passive time period.

In a further preferred exemplary embodiment of the testing device, it is provided that the active time period and/or the passive time period is/are selected to be longer than the pauses between successive sensor signals of a sequence of sensor signals that belong together, in particular of sensor signals of a radar frame that belong together. By selecting the detection periods accordingly, it can be ensured that a switchover to a new specified value for the time delay is carried out only when the transmission sequence for the successive sensor signals of a radar frame has been fully completed. The system thus does not switch to a new value for the specified time delay until the long transmission pause of a radar frame. This makes sense if the distance sensor to be tested evaluates the recorded data of a radar frame in its entirety, wherein all received—and mixed—sensor signals are evaluated individually (distance information) and a phase evaluation is carried out once over the entirety of the received—and mixed—sensor signals (speed information).

Also claimed is a computer program with instructions which, when executed with a signal processing unit of a testing device for testing a distance sensor operating with electromagnetic waves in the form of at least one temporally coherent and temporally limited sensor signal, cause the signal processing unit and thus the testing device to carry out an exemplary embodiment of the method described above.

There are numerous possibilities for realizing and further developing the testing device according to the invention and exemplary embodiments of the method according to the invention. This is shown in the following figures.

FIGS. 1 to 9 show, in various aspects and degrees of detail, a testing device 1 for testing a distance sensor 2 operating with electromagnetic waves in the form of at least one temporally coherent and temporally limited sensor signal, and a method 10 for operating a corresponding testing device 1.

The distance sensor 2 emits an electromagnetic free-space wave in the direction of the testing device 1 and receives a simulated electromagnetic reflection signal $S_{TX}$ which is generated by the testing device 1. To receive the free-space wave emitted by the distance sensor 2, the testing device 1 has a receiving element 3, and to emit the simulated electromagnetic reflection signal $S_{TX}$, the testing device 1 has an emission element 4. The distance sensor 2 itself does not belong to the testing device 1, but it is important to understand how the testing device 1 interacts with the distance sensor 2. The received signal $S_{RX}$ or a signal $S'_{RX}$ derived from the received signal $S_{RX}$ is routed via a signal processing unit 5, wherein a time delay in a specific range can be prespecified to the signal processing unit 5. The input signal of the time delay circuit 5 is thus time-delayed to form a time-delayed signal $S_{delay}$. The time-delayed signal $S_{delay}$ or a signal $S'_{delay}$ derived from the time-delayed signal $S_{delay}$ is then emitted as the simulated reflection signal $S_{TX}$ via the emission element 4.

In FIG. 1, it is indicated that the time delay $t_{delay, soll}$ to be achieved is supplied as information to the signal processing unit 5. In the testing device 1 shown here, the technical implementation of how exactly this information is supplied to the signal processing unit 5 is not important. Usually, the specification for the time delay to be set will come from an environment simulator that simulates the scene to be simulated with environmental objects and provides corresponding position, speed and/or acceleration information about the environmental objects. If, for example, it is known that the distance of the object to be simulated from the distance sensor to be tested is 30 m, then taking into account the speed of light as a signal propagation time of an electromagnetic wave, a corresponding time delay is calculated and $t_{delay, soll}$ is specified as a time delay.

Figure 2:
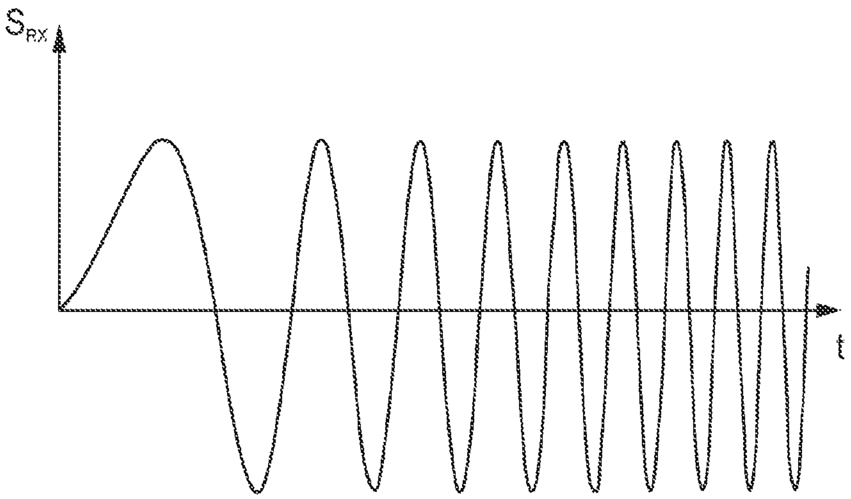
FIG. 2 illustrates a temporally coherent and temporally limited sensor signal in the form of a chirp.

FIG. 2 shows a temporally coherent and temporally limited sensor signal as the received signal $S_{RX}$ of the testing device 1. It is assumed here that the distance sensor 2 to be tested transmits signals of this type. A chirp signal, or chirp for short, which is a frequency-modulated signal, is shown here as a specific form of such a temporally coherent and temporally limited sensor signal. In the present case, the frequency of a sinusoidal oscillation increases with time. In the testing device 1, this chirp is then present as a received sensor signal $S_{RX}$ and also has a course that is continuous and therefore without phase jumps. The signal has a temporally limited range, i.e. it is a temporally limited wave packet.

Figure 3:
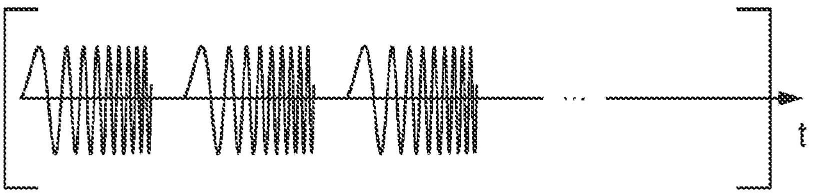
FIG. 3 illustrates a coherent chirp sequence (frame)

FIG. 3 shows a sequence of a plurality of chirps that follow one another in a temporally defined manner, namely spaced apart from one another in each case by a short transmission pause followed by a long transmission pause, which is standardly used for signal processing in distance sensors 2 known in the prior art.

Figure 4:
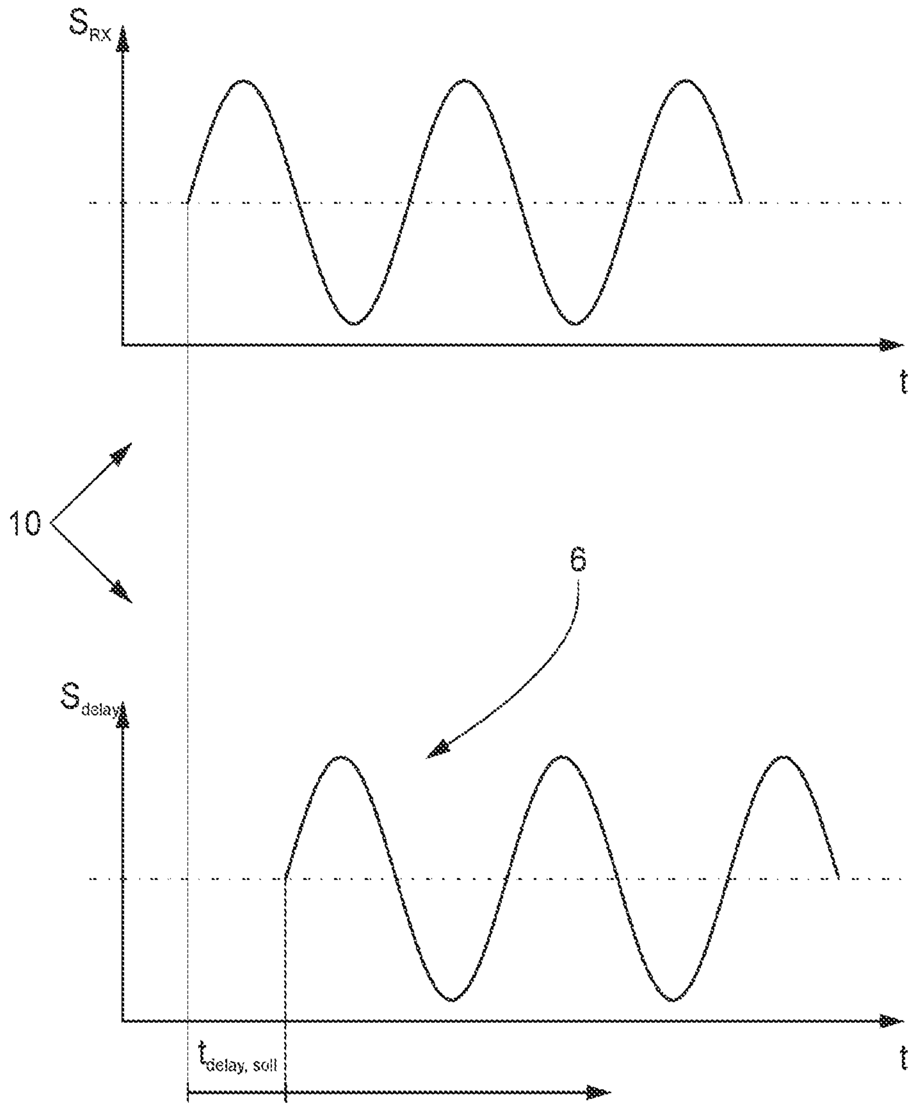
FIG. 4 illustrates a received temporally coherent and temporally limited sensor signal and the signal time delayed according to a predefined time delay.

In the distance sensor 2, each chirp received as a reflection signal is standardly evaluated to form a distance measurement value, i.e. also each individual chirp of a chirp frame. A piece of radial velocity information is calculated by evaluating the phase position of successive chirps with respect to one another. FIG. 4 shows the basic function of the testing device 1 and of the method 10. The testing device 1 receives the temporally coherent and temporally limited sensor signal as received signal $_{SRX}$, which is shown here as a sine wave for the sake of simplicity. If a time delay $t_{delay, soll}$ is specified in the testing device 1, then the received sensor signal $S_{RX}$ is time-delayed by the signal processing unit 5 by exactly this time delay value $t_{delay, soll}$. The specified value for the time delay $t_{delay, soll}$ corresponds to the propagation time of the simulated reflection signal at the object distance to be simulated.

Figure 5:
FIG. 5 illustrates a distance-velocity diagram with a typical and error-free measurement result after evaluation by a distance sensor.

FIG. 5 shows a distance-velocity diagram that represents the evaluation of a measurement sequence based on the evaluation of a chirp frame in a distance sensor 2. It can be seen here that an object has been detected at a distance R with only a small fluctuation range, and this object has a relative, radial velocity component v, which is also subject to practically hardly any fluctuation. This result is plausible. If, for example, it is assumed that a complete chirp sequence of a frame is transmitted in a few tens of milliseconds, i.e. the majority of measured values are also obtained within these few tens of milliseconds, then environmental objects known from everyday life, even if they are moving, have only a slightly variable location and an almost constant speed, since location and speed are not substantially variable in the short measurement time period, for example in a road traffic scenario.

Figure 6:
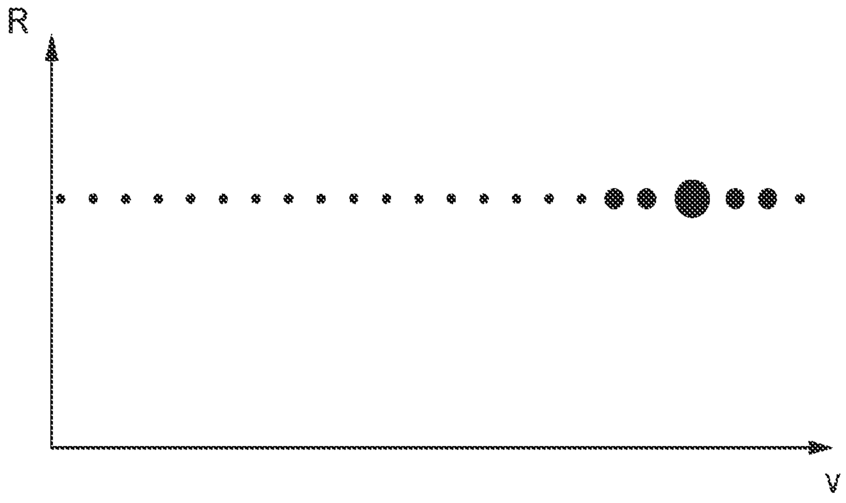
FIG. 6 illustrates a distance-velocity diagram with velocities apparently incorrectly determined by the distance sensor.

FIG. 6 shows a further distance-velocity diagram as a representation of the evaluation of a chirp sequence by a distance sensor 2, which was obtained by evaluating reflection signals simulated via the testing device 1. It can be seen that, although an object has been recognized at an almost constant distance, the speed information will scatter over a very wide range. The speed values determined by the distance sensor 2 scatter, although in this case the testing device 1 operates with a constant velocity v to be simulated. The question is therefore how this apparent misinterpretation comes about and how it can be avoided.

It has been recognized that such errors occur if the predetermined time delay $t_{delay, soll}$ changes while a received temporally coherent and temporally limited sensor signal $S_{RX}$ is in a delay step 6 and this changed predetermined time delay $t_{delay, soll, neu}$ is used as the basis for the time delay to be carried out in the delay step 6.

Figure 7:
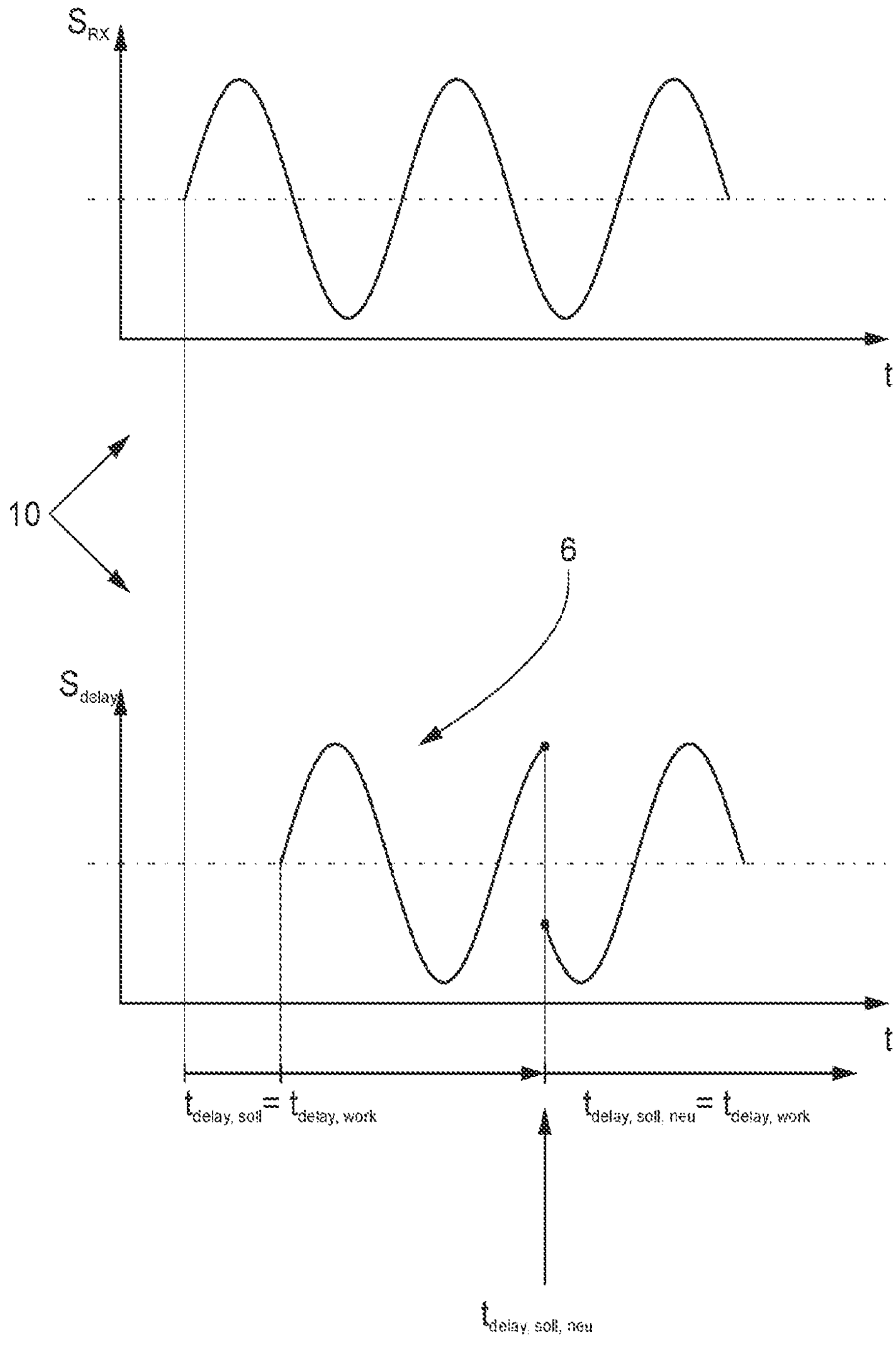
FIG. 7 illustrates a received temporally coherent and temporally limited sensor signal and the time-delayed signal simulated according to a predetermined time delay with a predetermined new time delay changed in the ongoing delay step and taken into account for the time delay, with resulting phase jump.

The effects of the described procedure are shown in FIG. 7. The upper diagram shows the received temporally coherent and temporally limited sensor signal $S_{RX}$, here again in the form of a sinusoidal wave packet. The lower diagram shows the time-delayed signal $S_{delay}$, i.e. the simulated reflection signal. At the beginning of the delay step 6, the predefined time delay $t_{delay, soll}$ is present, which is then used in the delay step 6 as the working time delay $t_{delay, work}$. While the time delay is still ongoing, i.e. delay step 6 has not yet been completed, a new value for the time delay $t_{delay, soll, neu}$ is specified and is also used directly as the working time delay $t_{delay, work}$. The term working time delay $t_{delay, work}$ is intended to make it clear that the delay value is not only passively present, but is used as the basis for calculating or determining the time-delayed signal. This switchover often results in a discontinuity in the calculated time-delayed signal $S_{delay}$, which can also be seen in the lower diagram in FIG. 7. It has been recognized that these discontinuities, i.e. jumps in the phase position, are the cause of the apparently faulty evaluations in distance sensors 2 to be tested that have been tested with testing devices 1 known in the prior art. It is therefore not actually the case that the evaluation in the distance sensors 2 to be tested is faulty: rather, the problem lies in the generation of the simulated reflection signal.

Figure 8:
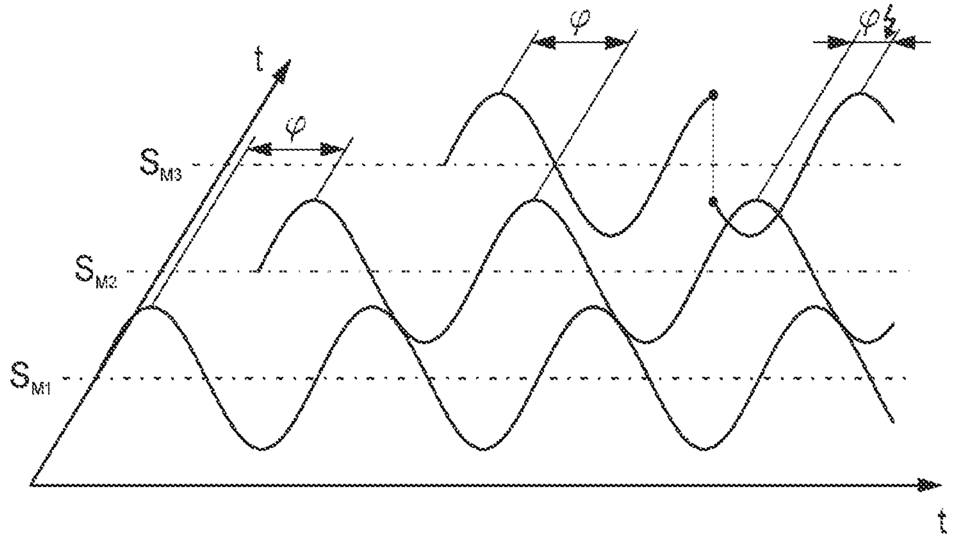
FIG. 8 schematically illustrates the evaluation of simulated reflection signals without phase jump and with phase jump in the distance sensor.

FIG. 8 explains the problems in evaluating the simulated reflection signals with discontinuities in a distance sensor 2. Three mixed signals $S_{M1}$, $S_{M2}$, $S_{M3}$ generated in the distance sensor 2 are shown, each of which is based on the mixture of an emitted chirp with the simulated reflected chirp generated by the testing device 1 and received back by the distance sensor 2. The mixed signals $S_{M1}$, $S_{M2}$, Sans are harmonic oscillations having an essentially fixed frequency. The temporal extension of each chirp or each mixed signal $S_{M1}$, $S_{M2}$, $S_{M3}$ is shown running from left to right along a first time axis. The successive chirps or the mixed signals $S_{M1}$, $S_{M2}$, $S_{M3}$ based on successive chirps are displayed temporally one after the other along the second time axis. To determine a piece of distance information, each mixed signal $S_{M1}$, $S_{M2}$, $S_{M3}$ is subjected to a frequency analysis and, in this way, a piece of distance information is obtained from each mixed signal $S_{M1}$, $S_{M2}$, $S_{M3}$. It can be seen that the different and temporally successive mixed signals $S_{M1}$, $S_{M2}$, $S_{M3}$ have a certain temporal offset and thus a phase offset $\varphi$, which is determined by a Fourier analysis of the data set in the direction of the second time axis. The first two mixed signals $S_{M1}$, $S_{M2}$ are continuous oscillation curves, which are based on mixing two undisturbed and likewise continuous chirp signals. In the third mixed signal $S_{M3}$, the simulated reflection signal generated by the testing device 1 exhibits a phase jump, as explained with reference to FIG. 7, because during the delay step 6, two different predefined time delays $t_{delay, soll}$ and $t_{delay, soll, neu}$ have been used as working time delays $t_{delay, work}$ for one temporally coherent and temporally limited sensor signal $S_{RX}$. The phase jump in the generated simulated reflection signal, as shown in FIG. 7, is of course carried over to the mixed signal SMS, as can be seen in FIG. 8. This results in different phase values $\varphi$ in the evaluation and correspondingly different velocity values resulting from the phase values. This explains the problems identified in the evaluation of the corresponding signals in the distance sensors 2.

Figure 9:
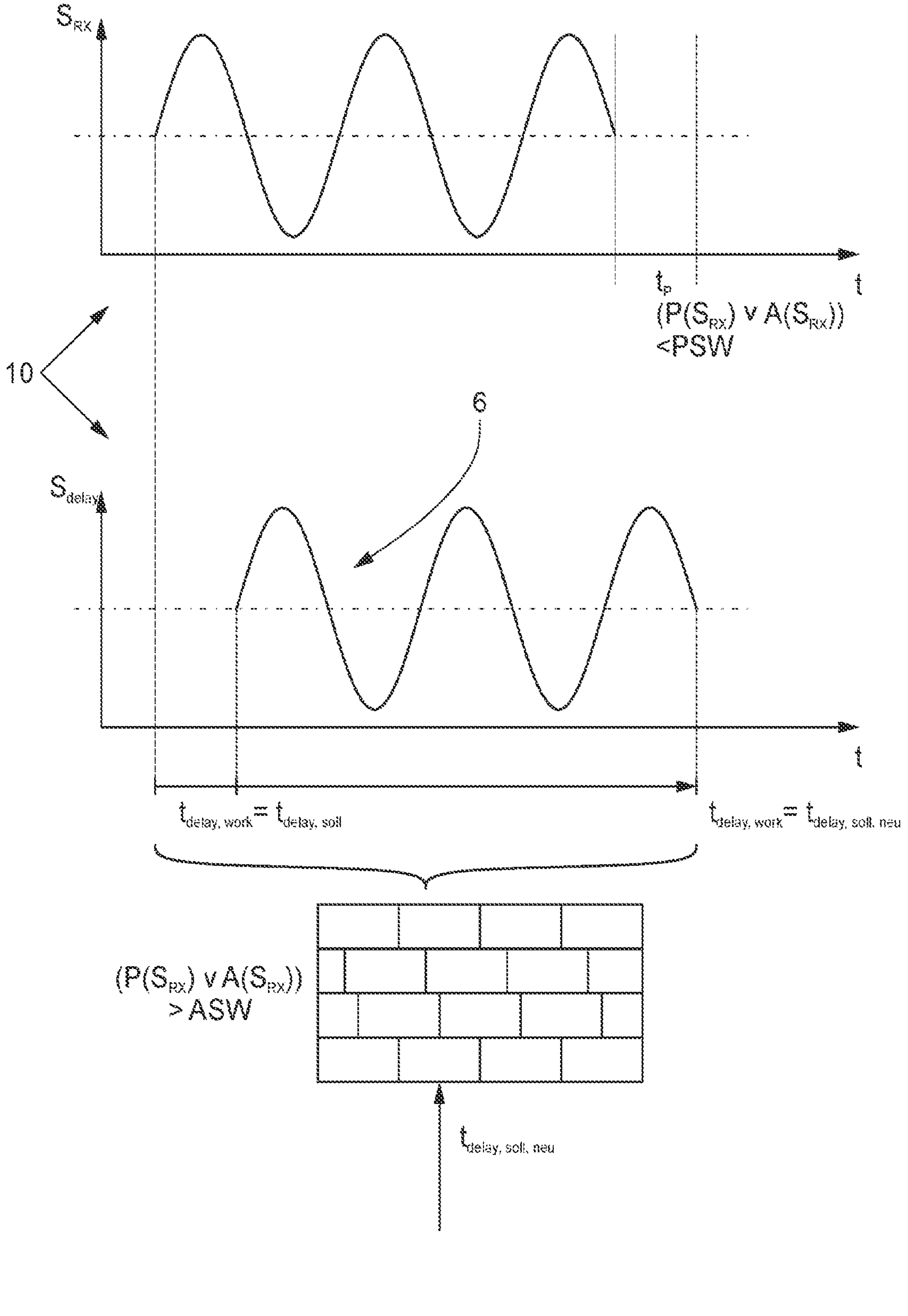
FIG. 9 schematically illustrates the time delay of a received temporally coherent and temporally limited sensor signal with a constant predetermined time delay despite a change of the predetermined time delay during the delay step for the purpose of avoiding phase jumps in the simulated reflection signal.

In the depicted testing device 1 and the depicted method 10, as shown in detail in FIG. 9, the indicated problems are solved in that the signal processing unit 5 fully processes a received temporally coherent and temporally limited sensor signal $S_{RX}$ or a received temporally coherent and temporally limited sensor signal $S'_{RX}$ derived from the received sensor signal $S_{RX}$ in a delay step 6 with the predefined time delay $t_{delay, soll}$ as a constant working time delay $t_{delay, work}$ to form a time-delayed sensor signal $S_{delay}$, which predefined time delay $t_{delay, soll}$ was predefined at the start of the delay step 6 and thus of the processing of the received temporally limited sensor signal $S_{RX}$, even when the predefinable time delay $t_{delay, soll}$ changes during the delay step 6 and thus during the ongoing processing of the received sensor signal $S_{RX}$ or of the received sensor signal $S'_{RX}$ derived from the received sensor signal $S_{RX}$. FIG. 9 shows that the time delay $t_{delay, soll, neu}$ newly specified during the delay step 6 is blocked for use as a new specification for the signal delay and is therefore not used as the basis for calculating the time-delayed simulated reflection signal until the delay step 6 has been completed on the basis of the old specified time delay $t_{delay, soll}$. Only then is the new time delay $t_{delay, soll, neu}$, newly specified already during the time delay step, used as the working time delay $t_{delay, work}$.

The testing device 1 shown in the figures and the method 10 shown are characterized by the fact that the ongoing processing of the received sensor signal $S_{RX}$ or of the received sensor signal $S'_{RX}$ derived from the received sensor signal $S_{RX}$ is detected in the delay step 6 in that the signal processing unit 5 determines the signal level A or the signal power P of the received signal $S_{RX}$ or of the received signal $S'_{RX}$ derived from the received signal $S_{RX}$ and, if a predetermined active threshold value ASW for the signal level or the signal power is exceeded by the determined signal level A or the determined signal power P, the signal processing unit concludes that the processing of the received sensor signal $S_{RX}$ or of the received sensor signal $S'_{RX}$ derived from the received sensor signal $S_{RX}$ is still ongoing $((P(S_{RX}) \vee A(S_{RX}))>ASW)$.

The testing device 1 shown in the figures and the method 10 shown are implemented in such a way that the signal processing unit 5 detects the start of the delay step 6 and thus the start of the ongoing processing of the received sensor signal $S_{RX}$ or of the received sensor signal $S'_{RX}$ derived from the received sensor signal $S_{RX}$ when the predetermined active threshold value ASW for the signal level or the signal power is exceeded by the determined signal level A or the determined signal power P for a predetermined active time period.

The testing device 1 shown in the figures and the method shown 10 further have in common that the end of the delay step 6 and thus the absence of the ongoing processing of the received sensor signal $S_{RX}$ or of the received sensor signal $S'_{RX}$ derived from the received sensor signal $S_{RX}$ is detected in that the signal processing unit 5 determines the signal level A or the signal power P of the received signal $S_{RX}$ or of the received signal S'RY derived from the received signal $S_{RX}$ and, if a predetermined passive threshold value PSW for the signal level or the signal power is undershot by the determined signal level A or by the determined signal power P, the signal processing unit concludes that no processing of the received sensor signal $S_{RX}$ or of the received sensor signal $S'_{RX}$ derived from the received sensor signal $S_{RX}$ is taking place.

The testing device 1 shown in the figures and the method 10 shown are further designed in such a way that the signal processing unit 5 detects the end of the delay step 6 and thus the termination of the ongoing processing of the received sensor signal $S_{RX}$ or of the received sensor signal $S'_{RX}$ derived from the received sensor signal $S_{RX}$ when the predetermined passive threshold value PSW for the signal level or the signal power is undershot by the determined signal level A or the determined signal power P for a predetermined passive time period $t_P((P(S_{RX})_V\ A(S_{RX}))<PSW)$. In the present case, the passive time period $t_P$ has the length of the specified time delay $t_{delay, soll}$, which was used as the working time delay $t_{delay, work}$ during delay step 6. This makes sense, because the processed, simulated, time-delayed signal is in any case present in the testing device 1 for longer, by the value of the time delay, than the received signal is received.

In the illustrated realizations of the testing device 1 and the method 10, the passive time period $t_P$ has been selected to be longer than the pauses between successive sensor signals of a sequence of sensor signals that belong together, namely of sensor signals that belong together of a radar frame. The result of this is that a change to a new prespecified time delay $t_{delay, soll, neu}$ as effective working time delay $t_{delay, work}$ is not possible until the sensor signals of a completely new radar frame are received.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Testing device
2 Distance sensor
3 Receiving element
4 Emission element
5 Signal processing unit
6 Delay step
10 Method
$S_{RX}$ Received signal
$S'_{RX}$ Received signal derived from the received signal $S_{RX}$
$S_{TX}$ Output signal
$t_{delay, soll}$ Predefinable time delay
$S_{delay}$ Time-delayed signal
$S'_{delay}$ Time-delayed signal derived from the time-delayed signal
$t_{delay, soll, neu}$ Newly specified time delay
$t_{delay, work}$ Constant working time delay
$t_{delay, soll}$ Predefinable time delay
$S_{M1}$, $S_{M2}$, $S_{M3}$ Mixed signals
φ Phase offset
R Distance
v Velocity
A Signal level
P Signal power
ASW Active threshold value
PSW Passive threshold value
$t_P$ Passive time period

The invention claimed is:

1. A testing device for testing a distance sensor that operates using electromagnetic waves in the form of at least one temporally coherent and temporally limited sensor signal, comprising:

a receiving element for receiving an electromagnetic free-space wave as a received signal;

an emission element for emitting an electromagnetic output signal; and a signal processing unit;

wherein the signal processing unit is configured to, during a simulation operation, guide the received signal or a derived signal derived from the received signal with a predefinable time delay to form a time-delayed signal as a simulated reflection signal;

wherein the emission element is configured to emit the time-delayed signal or a derived time-delayed signal derived from the time-delayed signal is emitted as the electromagnetic output signal;

wherein the signal processing unit is configured to fully process a received sensor signal or a derived sensor signal derived from the received sensor signal in a delay step with the predefinable time delay as a constant working time delay to form a time-delayed sensor signal, wherein the predefinable time delay was predefined at a start of the delay step;

wherein the signal processing unit is configured to detect ongoing processing of the received sensor signal or of the derived sensor signal in the delay step based on:

determining a signal level or signal power of the received sensor signal or of the derived sensor signal, and based on a predetermined active threshold value being exceeded by the determined signal level or signal power, determining that processing of the received sensor signal or the derived sensor signal is ongoing.

2. The testing device according to claim 1, wherein the signal processing unit is configured to detect the start of the delay step based on the predetermined active threshold value being exceeded by the determined signal level or signal power for a predetermined active time period.

3. The testing device according to claim 2, wherein the predetermined active time period is longer than pauses between successive sensor signals of a sequence of sensor signals that belong together of a radar frame.

4. The testing device according to claim 1, wherein the signal processing unit is configured to detect an end of the delay step based on:

determining the signal level or signal power of the received sensor signal or of the derived sensor signal; and based on a predetermined passive threshold value being above the determined signal level or signal power, determining that no processing is taking place of the received sensor signal or the derived sensor signal.

5. The testing device according to claim 4, wherein determining that no processing is taking place of the received sensor signal or the derived sensor signal is further based on the predetermined passive threshold value being above the determined signal level or signal power for a predetermined passive time period.

6. The testing device according to claim 5, wherein the predetermined passive time period is longer than pauses between successive sensor signals of a sequence of sensor signals that belong together of a radar frame.

7. The testing device according to claim 1, wherein the received sensor signal is temporally coherent and temporally limited, or the derived sensor signal is temporally coherent and temporally limited.

8. A method for operating a testing device for testing a distance sensor that operates using electromagnetic waves in the form of at least one temporally coherent and temporally limited sensor signal, the method comprising:

receiving, by a receiving element of the testing device, an electromagnetic free-space wave as a received signal;

during a simulation operation, guiding by a signal processing unit of the testing device, the received signal or a derived signal derived from the received signal with a predefinable time delay to form a time-delayed signal as a simulated reflection signal;

emitting, by an emission element of the testing device, the time-delayed signal or a derived time-delayed signal derived from the time-delayed signal as an electromagnetic output signal;

fully processing, by the signal processing unit, a received sensor signal or a derived sensor signal derived from the received sensor signal in a delay step with the predefinable time delay as a constant working time delay to form a time-delayed sensor signal, wherein the predefinable time delay was predefined at a start of the delay step; and detecting, by the signal processing unit, ongoing processing of the received sensor signal or of the derived sensor signal in the delay step based on:

determining a signal level or signal power of the received sensor signal or of the derived sensor signal, and based on a predetermined active threshold value being exceeded by the determined signal level or signal power, determining that processing of the received sensor signal or the derived sensor signal is ongoing.

9. The method according to claim 8, wherein the received sensor signal is temporally coherent and temporally limited, or the derived sensor signal is temporally coherent and temporally limited.

10. A non-transitory computer-readable medium having instructions stored thereon, wherein the instructions, when executed, facilitate performance of the following:

receiving, by a receiving element of a testing device, an electromagnetic free-space wave as a received signal;

during a simulation operation, guiding by a signal processing unit of the testing device, the received signal or a derived signal derived from the received signal with a predefinable time delay to form a time-delayed signal as a simulated reflection signal;

emitting, by an emission element of the testing device, the time-delayed signal or a derived time-delayed signal derived from the time-delayed signal as an electromagnetic output signal;

fully processing, by the signal processing unit, a received sensor signal or a derived sensor signal derived from the received sensor signal in a delay step with the predefinable time delay as a constant working time delay to form a time-delayed sensor signal, wherein the predefinable time delay was predefined at a start of the delay step; and detecting, by the signal processing unit, ongoing processing of the received sensor signal or of the derived sensor signal in the delay step based on:

determining a signal level or signal power of the received sensor signal or of the derived sensor signal, and based on a predetermined active threshold value being exceeded by the determined signal level or signal power, determining that processing of the received sensor signal or the derived sensor signal is ongoing.

11. The non-transitory computer-readable medium according to claim 10, wherein the received sensor signal is temporally coherent and temporally limited, or the derived sensor signal is temporally coherent and temporally limited.

* * * * *